(12) United States Patent
Veysoglu et al.

(10) Patent No.: US 10,444,371 B2
(45) Date of Patent: Oct. 15, 2019

(54) INTERFERENCE GEOLOCATION USING A SATELLITE CONSTELLATION

(71) Applicant: The Boeing Company, Seal Beach, CA (US)

(72) Inventors: Murat E. Veysoglu, Cypress, CA (US); Manuel C. Martinez-Lavin, Playa del Rey, CA (US); Lisa Kuo, Rancho Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 516 days.

(21) Appl. No.: 14/221,673

(22) Filed: Mar. 21, 2014

(65) Prior Publication Data
US 2015/0268349 A1    Sep. 24, 2015

(51) Int. Cl.
*G01S 19/21* (2010.01)
*G01S 5/10* (2006.01)

(52) U.S. Cl.
CPC ............ *G01S 19/21* (2013.01); *G01S 5/10* (2013.01)

(58) Field of Classification Search
CPC ..... G01S 5/04; G01S 5/06; G01S 5/12; G01S 5/14
See application file for complete search history.

(56) References Cited

U.S. PATENT DOCUMENTS

| | | | |
|---|---|---|---|
| 5,008,679 A | 4/1991 | Effland et al. | |
| 5,595,360 A * | 1/1997 | Spitzer | B64G 1/007 244/158.5 |
| 5,844,521 A | 12/1998 | Stephens et al. | |
| 6,018,312 A * | 1/2000 | Haworth | G01S 1/026 342/353 |
| 6,102,335 A * | 8/2000 | Castiel | B64G 1/1007 244/158.4 |

(Continued)

FOREIGN PATENT DOCUMENTS

| | | |
|---|---|---|
| JP | 2004-328088 A | 11/2004 |
| JP | 3697522 B2 | 9/2005 |
| JP | 2010540922 A | 12/2010 |

OTHER PUBLICATIONS

European Search Report for Application No. 15150911.4 dated Jul. 27, 2015.

(Continued)

*Primary Examiner* — Vladimir Magloire
*Assistant Examiner* — Daniel P Malley, Sr.
(74) *Attorney, Agent, or Firm* — Womble Bond Dickinson (US) LLP

(57) ABSTRACT

A system includes a plurality of satellites including respective antennas and circuitry. The satellites form a satellite constellation and revolve around a rotating astronomical object from which a source radiates interference toward a target satellite for at least some period of time as the target satellite revolves in a target orbit. The satellites' respective antennas may capture the interference when the satellite constellation is substantially in-line between the source and target satellite, and their circuitry may generate respective measurements based thereon. The circuitry may geolocate or cause transmission of the respective measurements for geolocation of the source based on the respective measurements to thereby identify a location of the source on the astronomical object.

12 Claims, 7 Drawing Sheets

(56) References Cited

U.S. PATENT DOCUMENTS

| | | | |
|---|---|---|---|
| 6,417,799 B1 | 7/2002 | Aubain et al. | |
| 6,470,243 B1 | 10/2002 | Eyerly et al. | |
| 6,511,020 B2* | 1/2003 | Higgins | B64G 1/1007 244/158.4 |
| 6,725,016 B1* | 4/2004 | Jeong | H04B 1/711 375/347 |
| 8,004,459 B2 | 8/2011 | Ho et al. | |
| 8,825,232 B2* | 9/2014 | Knoblach | B64B 1/40 244/128 |
| 2002/0070889 A1* | 6/2002 | Griffin | G01S 1/045 342/353 |
| 2002/0160710 A1* | 10/2002 | Castiel | H04B 7/195 455/12.1 |
| 2003/0117319 A1* | 6/2003 | Rideout | G01S 5/06 342/453 |
| 2008/0237399 A1* | 10/2008 | Caplin | B64G 1/1085 244/158.4 |
| 2008/0252516 A1* | 10/2008 | Ho | G01S 5/0273 342/357.21 |
| 2009/0278733 A1* | 11/2009 | Haworth | G01S 5/06 342/357.4 |
| 2010/0045506 A1* | 2/2010 | Law | G01S 19/21 342/13 |
| 2010/0201570 A1 | 8/2010 | Shemar et al. | |
| 2011/0057834 A1* | 3/2011 | Miller | G01S 19/37 342/357.25 |
| 2011/0248887 A1 | 10/2011 | Whelan et al. | |
| 2013/0062471 A1* | 3/2013 | Lim | B64G 1/1007 244/158.6 |
| 2014/0145882 A1 | 5/2014 | Kuo et al. | |
| 2014/0154972 A1* | 6/2014 | Mengwasser | H04B 7/18515 455/12.1 |
| 2016/0011318 A1* | 1/2016 | Cohen | G01S 19/05 342/357.26 |

OTHER PUBLICATIONS

Chan, "Application of a Dual Satellite Geolocation System on Locating Sweeping Interference," World Academy of Science, Engineering and Technology, vol. 69, 2012, 6 pages.

Chestnut, "Emitter Location Accuracy Using TDOA and Differential Doppler," IEEE Trans. Aerosp. Electronic Syst., vol. AES-18, No. 2, Mar. 1982, pp. 214-218.

Ho et al., "Geolocation of a Known Altitude Object From TDOA and FDOA Measurements," IEEE Trans. Aerosp. Electronic Syst., vol. 33, No. 3, Jul. 1997, pp. 770-783.

Mclain, "Geostationary Orbits Part 1: Physical Principles," Copyright 1995-2002, Society of Broadcast Engineers (SBE) Chapter 24 Newsletter, 7 pages.

Mclain, "Geostationary Orbits Part 2: Orbital Geometry," Copyright 1995-2002, Society of Broadcast Engineers (SBE) Chapter 24 Newsletter, 9 pages.

"Orbital Elements," 2013, Wikipedia article—http://en.wikipedia.org/w/index.php?title=Orbital_elements& printable=yes [Nov. 27, 2013], 7 pages.

Notice of Rejection; JP 2015-025383; dated Sep. 4, 2018.

Decision of Rejection;Chinese Application 201510117912.1; dated Mar. 4, 2019.

Communication Pursuant to Article 94(3) EPC; European Application No. 15150911.4-1206; dated Aug. 9, 2019.

* cited by examiner

INTERFERENCE GEOLOCATION USING A SATELLITE CONSTELLATION

TECHNOLOGICAL FIELD

The present disclosure relates generally to satellite systems and, in particular, to the use of a satellite constellation to geolocate a source of interference acting on a target satellite.

BACKGROUND

Satellite systems have been used extensively to provide a variety of satellite-based services and functions. For example, current satellite systems provide communications services, broadcast and multicast services, earth imaging, radar, weather monitoring, astronomical observations and the like.

A satellite system may include a single satellite or a plurality of satellites whose functionality are combined in some manner. Satellites may travel in geosynchronous orbits (GSO) or non-geosynchronous orbits (NGSO), and may be referred to as GSO satellites or NGSO satellites, respectively. A satellite of a single satellite system typically is a GSO satellite, so that the satellite may provide continuous service over a distinct coverage area on the surface of the earth. Pluralities of satellites may include GSO and/or NGSO satellites.

A GSO satellite orbits the earth approximately once per day in synchronous motion with the revolution or rotation of the earth. The GSO satellite may be positioned at some inclination with respect to the earth's equator—"geostationary" referring to the special case in which the orbit of a GSO satellite is positioned in the equatorial plane (at an inclination of zero degrees). Communicating with a geostationary satellite has some obvious advantages in that an earth station antenna can remain pointed in one stationary and fixed direction without the need for active control to maintain pointing at the geostationary satellite.

Interference mitigation in many satellite systems often involves geolocating source(s) of interference (sometimes referred to as interference sources, interferers or the like) on or near the surface of the earth. Many techniques have been developed for this geolocation, including frequency difference of arrival (FDOA) techniques that rely on a Doppler shift in interfering signals between an interferer and satellite, and time difference of arrival (TDOA) techniques that rely on interfering signals received by multiple satellites. But for interference received by GSO satellites, FDOA information may be difficult to detect due to a weak Doppler signature received by such satellites; and for TDOA, multiple GSO satellites may not be in a close enough vicinity of one another to render the TDOA approach effective.

BRIEF SUMMARY

Example implementations of the present disclosure are generally directed to a system and an associated method of using a satellite constellation to geolocate a source of interference for a target satellite. According to one aspect of example implementations of the present disclosure, a system is provided that includes a plurality of satellites with respective antennas and circuitry. The satellites may be configured to form a satellite constellation and revolve around the earth (or some other rotating astronomical object) from which a source radiates interference toward a target satellite for at least some period of time as the target satellite revolves around the earth in a target orbit.

The respective antennas of the satellites of the satellite constellation may be configured to capture the interference when the satellite constellation is substantially in-line between the source and target satellite. In this regard, the source may radiate the interference in a beam having a beamwidth in which the satellite constellation may be configured to be substantially within when the interference is captured.

The circuitry of the satellites may be configured to generate respective measurements based on the interference captured by the respective antennas. The circuitry may be configured to geolocate or cause transmission of the respective measurements for geolocation of the source based on the respective measurements to thereby identify a location of the source on the surface of the earth.

In some examples, the satellites may be configured to form the satellite constellation and revolve with a longitudinal separation between satellites of less than approximately two degrees. In these examples, the satellites may be configured to revolve in respective orbits that have respective inclination angles that are within approximately two degrees of one another. Or in some other examples, the orbits may have respective inclination angles that are greater than two degrees from one another.

In some examples, the circuitry of a satellite of the plurality of satellites may be configured to geolocate the source to thereby identify the location of the source, and cause transmission of the location of the source to a surface-based station on the earth. In some examples, the circuitry of the satellites may be configured to cause transmission of the respective measurements to a surface-based station on the earth for geolocation of the source thereat.

In other aspects of example implementations, a method is provided for using a satellite constellation to geolocate a source of interference for a target satellite. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1A:
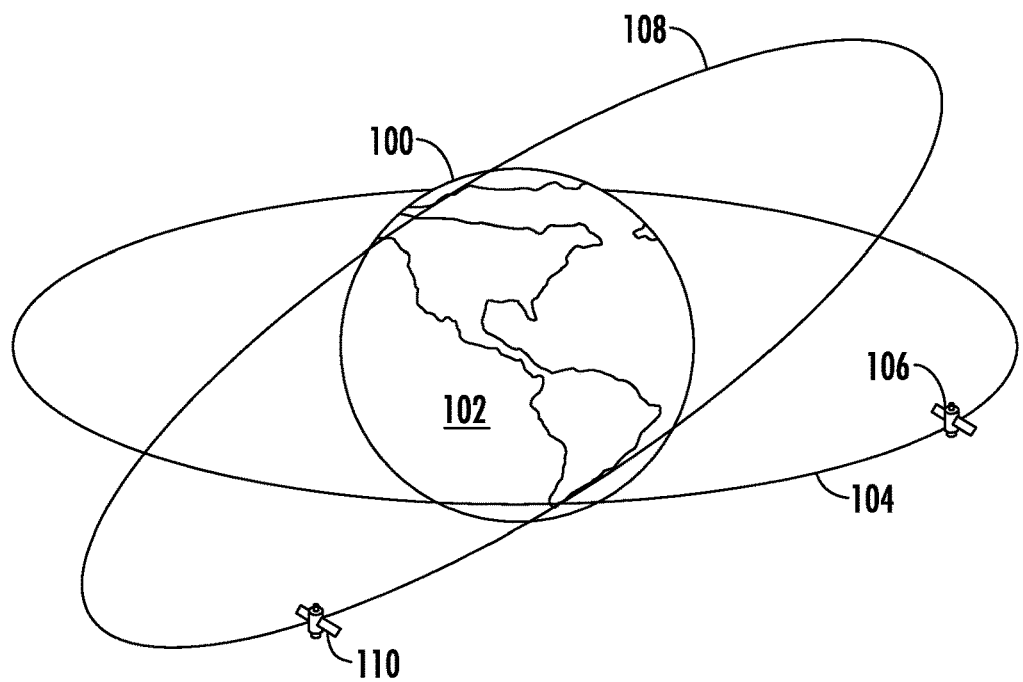
FIGS. 1A and 1B illustrate the earth and the orbits of satellites that may revolve around it, as well as a diagram depicting planes in which the respective orbits may lie, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to quantitative measures, values or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure relate generally to satellite systems and, in particular, to geolocating a source of interference using a satellite constellation. As described herein, the term "satellite" may be used without loss of generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

Example implementations will also be disclosed primarily in the context of satellites revolving around the earth, but it should be understood that example implementations are equally applicable to satellites revolving around any of a number of other rotating astronomical objects. In the context of satellites revolving around the earth, satellites may travel in "geosynchronous orbits" (GSO)—including the more specific "geostationary orbit"—or "non-geosynchronous orbits" (NGSO), and satellites may be accordingly referenced (e.g., GSO satellite, geostationary satellite, NGSO satellite). More generally in the context of satellites revolving around any of a number of different astronomical objects (including the earth), satellites may travel in "synchronous"—including the more specific "stationary" orbit—or "non-synchronous orbits," and the satellites may be accordingly referenced. Similarly, whereas a source of interference on the earth may be "geolocated," the term should also more generally be taken to encompass assessing the location of the source of interference on any of a number of astronomical objects (including the earth).

Figure 1B:
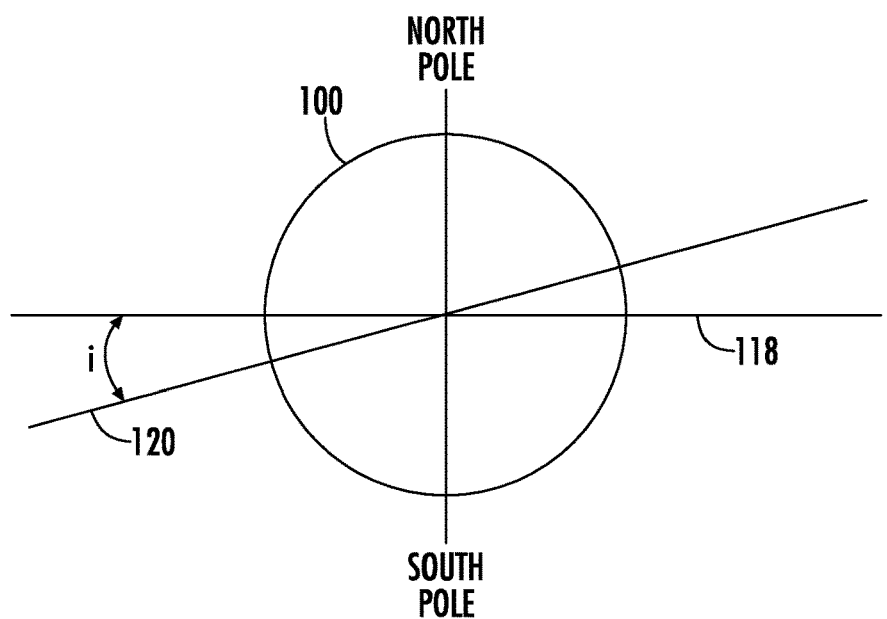

FIG. 1A illustrates the earth 100 and a surface 102 thereof. FIG. 1A also illustrates two of a number of possible orbits that may be geosynchronous orbits (GSO) or non-geosynchronous orbits (NGSO), and which may define and may sometimes be referred to by corresponding belts around the earth. As shown, the orbits may include an equatorial orbit 104 (that may define an equatorial belt) of one or more satellites 106. In some examples, one of these equatorial orbits may be the more particular geostationary orbit of one or more GSO satellites. The orbits may include an inclined orbit 108 (that may define an inclined belt) of one or more satellites 110. FIG. 1B is a diagram in relation to the earth depicting an equatorial plane 118 of the equatorial geostationary orbit, and an inclined orbital plane 120 of the inclined orbit having an inclination angle i relative to the equatorial plane.

Figure 2:
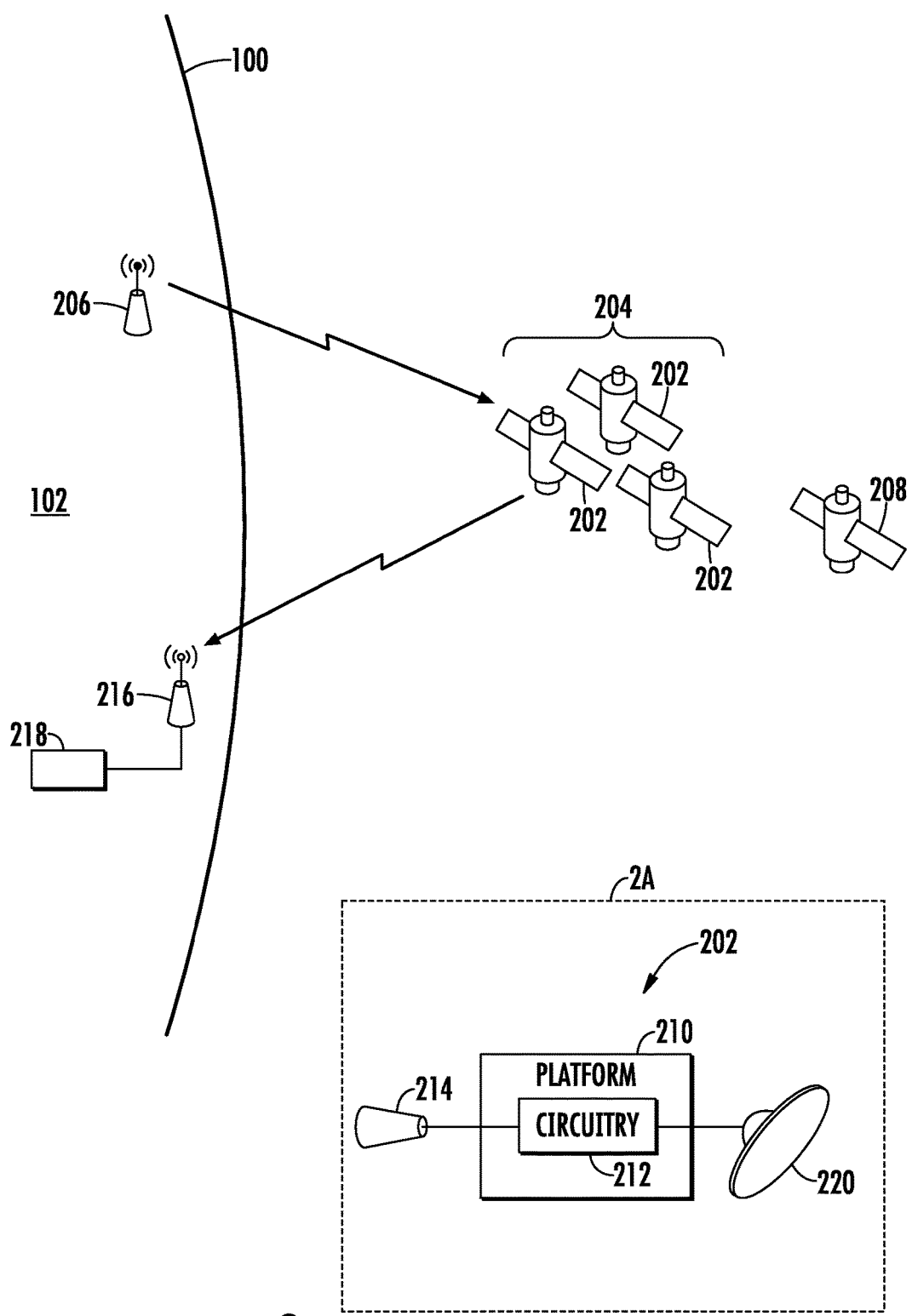
FIGS. 2, 3 and 4 illustrate a system including a satellite constellation according to some example implementations.

FIG. 2 illustrates a system according to some example implementations of the present disclosure. As shown, the system includes a plurality of satellites 202 configured to form a satellite constellation 204 and revolve around the earth 100 or some other rotating astronomical object. The earth has a surface 102 from which a source 206 radiates interference toward a target satellite 208 (e.g., satellite 106, 110) for at least some period of time as the target satellite revolves around the earth in a target orbit (perpendicular to the page) (e.g., orbit 104, 108). The target satellite may be a GSO or NGSO satellite that revolves around the earth in a synchronous or non-synchronous orbit; or in some more particular examples, the target satellite may be a geostationary satellite that revolves around the earth in a geostationary orbit.

The satellites 202 (e.g., satellites 110) of the satellite constellation 204 may be configured to revolve around the earth 100 (or other astronomical object) in respective orbits (also perpendicular to the page) (e.g., inclined orbits 108). In some examples, the orbits of the satellites may have some inclination angle i relative to an orbital plane in which the target orbit lies.

Figure 3:
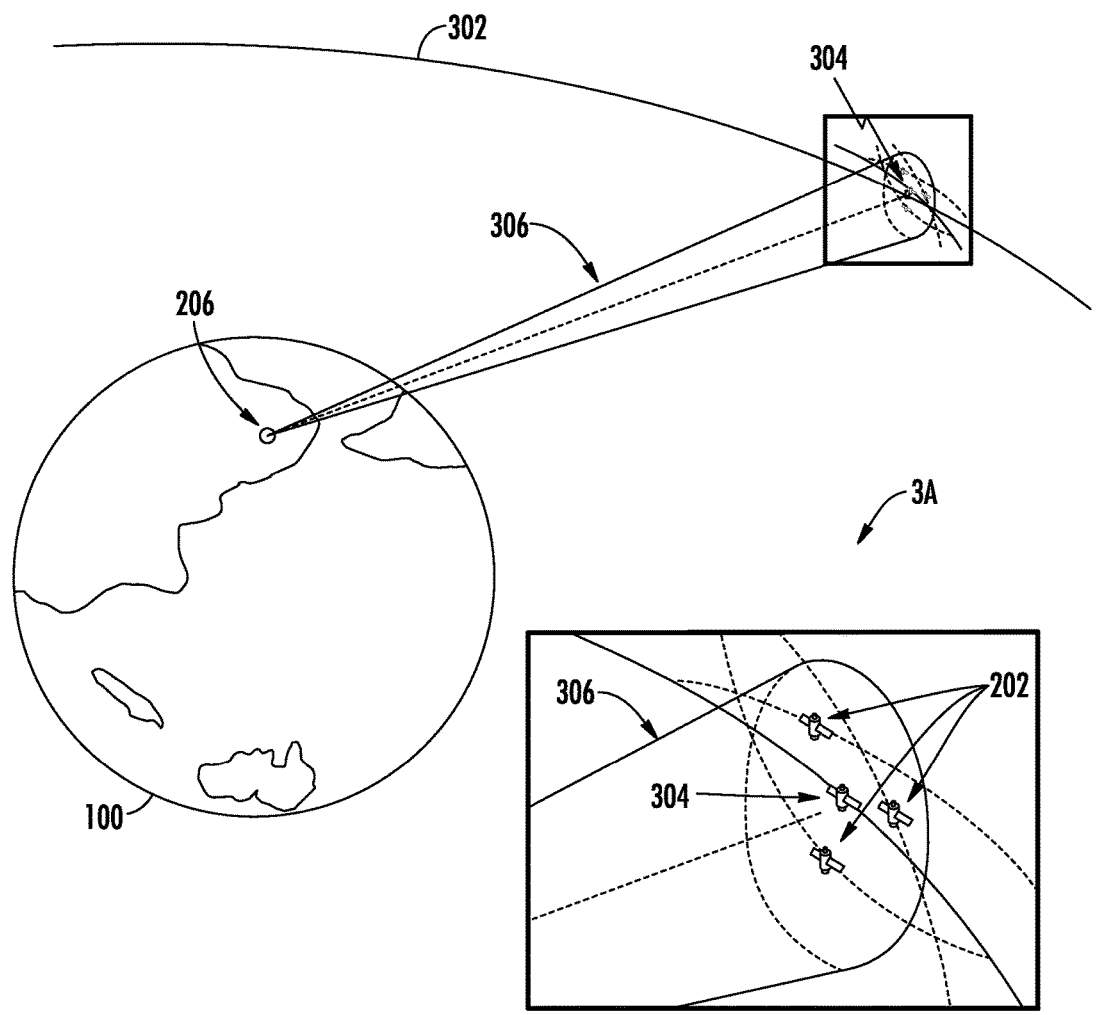

As shown more particularly in FIG. 3 and an exploded portion 3A thereof, the source 206 may radiate interference from its location on the surface 102 of the earth 100 (or other astronomical object) to a point on the target orbit 302 of the target satellite 208—this point at times referred to as a "target orbit location" 304. The radiating interference from the source at its surface-based location to the target orbit location may at times be referred to as a "target link" or "target beam" 306. As described below, it is at the period of time when the satellite constellation 204 is in position to receive the interference (signal) from the source, when it may be possible to geolocate the source based on measurements generated therefrom—such as to thereby enable mitigation of the interference from signals aimed at the target satellite.

Returning now to FIG. 2, as shown in inset 2A, the satellites 202 of the satellite constellation 204 may have respective communication platforms 210 each of which includes circuitry 212 and carries one or more antennas 214. According to example implementations of the present disclosure, the respective antennas may be configured to capture the interference when the satellite constellation is substantially in-line (within the target link 306) between the source 206 and target satellite 208 (the target satellite then being at the target orbit location 304). The circuitry may be configured to generate respective measurements based on the captured interference.

The circuitry 212 then may be configured to geolocate or cause transmission of the respective measurements for geolocation of the source 206 based on the respective measurements (generated based on the captured interference) to thereby identify the location of the source on the surface 102 of the earth 100 (or other astronomical object). Example implementations may similarly geolocate one or more sources of interference for the target satellite 208, and may do so for even a plurality of target satellites that revolve around the earth in respective target orbits that are the same or different from one another. These other sources of interference may have the same or different surface-based locations and radiate interference to the same or different target orbit locations 304, and may thereby establish coincident or separate target links 306.

In various examples, the source 206 may be geolocated by one of the satellites 202 or a surface-based station 216 on the earth 100 (or other astronomical object) like a station coupled to or otherwise part of a network 218, or other computing servers, services or the like. In some examples, then, the circuitry 212 of the satellites may be configured to cause transmission of the respective measurements to the surface-based station for geolocation of the source thereat.

Here, the antenna 214 may be a single, global horn antenna, and the circuitry may include a receiver, filter and/or and frequency converter. In other examples, one of the satellites of the satellite constellation may receive the measurements from others of the satellites, and the circuitry of the respective satellite may be configured to geolocate the source. In the aforementioned and some other examples, the satellites may further include respective one or more second antennas 220 for transmission of the measurements or geolocation of the source identified by one of the satellites. In any instance, the location of the source may be used for any of a number of purposes. For example, the interference radiated from the source may be mitigated or mitigatable from signals received by the target satellite 208 (or each of the target satellites) based on the location of the source, such as by the surface-based station (including through appropriate configuration of the target satellite from the surface-based station).

In some examples, the satellite 202 or surface-based station 216 may geolocate the source 206 according to any of a number of different techniques, including frequency difference of arrival (FDOA) techniques, time difference of arrival (TDOA) or various combinations thereof. For example, the measurements generated by the satellites may be filtered and cross-correlated such that their time difference of arrival and frequency difference of arrival may be determined, which may then be used to determine the location of the source. Examples of techniques according to which the difference of arrival information may be used are described in Chestnut, P., *Emitter Location Accuracy Using TDOA and Differential Doppler*, IEEE TRANS. AERO. & ELEC. SYS., vol. 18, No. 2 (1982); and Ho, K. C. et al., *Geolocation of a Known Altitude Object from TDOA and FDOA Measurements*, IEEE TRANS, AERO & ELEC. SYS., vol. 33, No. 3 (July 1997), the content of both of which are hereby incorporated by reference in their entireties.

The period of time that the satellite constellation 204 may capture the interference makes it possible to obtain multiple estimates of the location of its source 206. In the case of two satellites in the constellation, for example, TDOA information that may be obtained at a given time instance may provide a curve of possible locations on the earth 100. Repeating the process multiple times and finding the intersection of different curves may then constrain the location to a single point.

Figure 4:
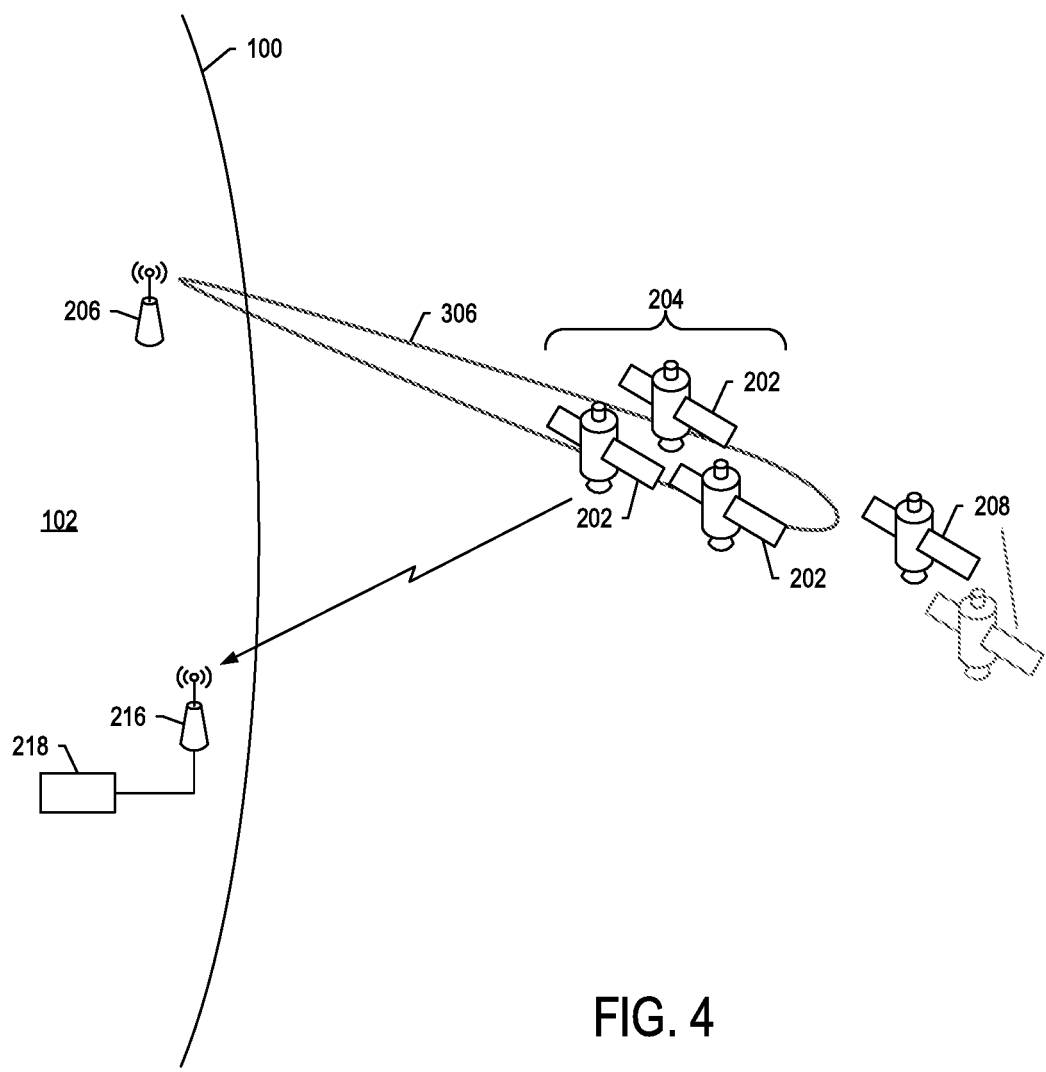
Figure 5:
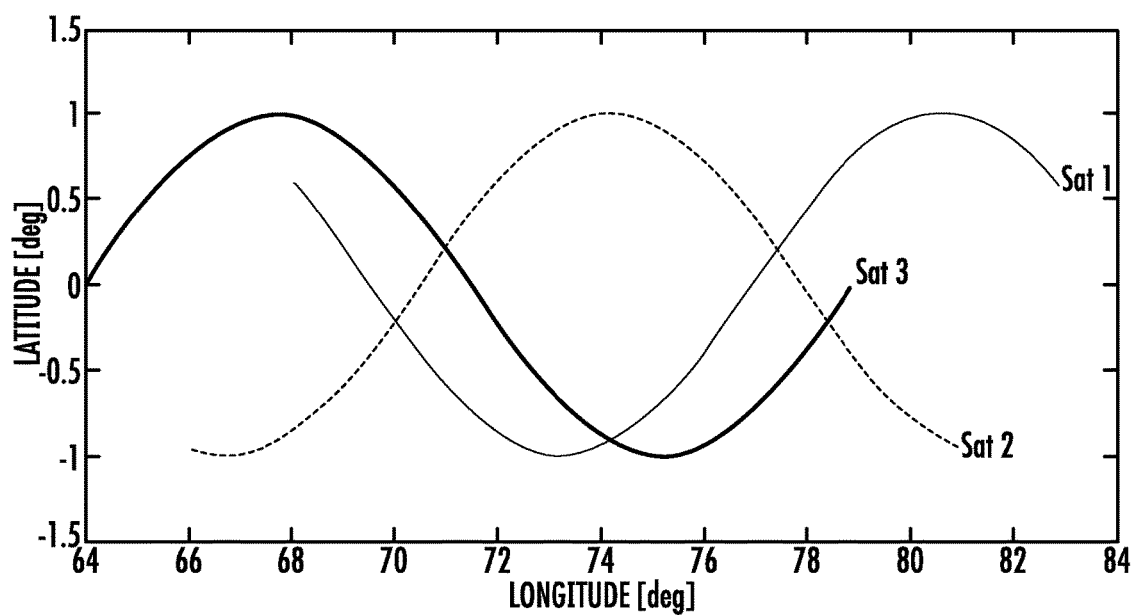
FIG. 5 illustrates a ground track of an example satellite constellation with three satellites according to some example implementations.

As will be appreciated, the satellites 202 may be configured to form the satellite constellation 204 and revolve in a number of different manners to thereby enable the geolocation (or generation of measurements for geolocation) of the source 206 of interference. In some examples, their respective orbits may be selected to maintain sufficient separation between the satellites and/or a velocity differential to provide accurate estimation of the location of the source while receiving the interference at detectable levels. FIG. 4 illustrates the source radiating the interference in a target beam 306 having a beamwidth; and in some examples, the orbital positions of the satellites may be arranged such that all of the satellites are substantially within the beamwidth when the interference is captured. FIG. 5 illustrates a ground track of an example constellation with three satellites, where as shown, each line identifies the longitudinal and latitudinal location of a respective satellite. In some examples, the satellites may have a longitudinal separation of less than approximately two degrees.

In some examples that may be particularly beneficial in instances in which the target satellite 208 is a GSO satellite, the satellite constellation 204 may be placed in respective over-synchronous or under-synchronous orbits such that they may traverse the entire geosynchronous arc. The inclination angle i and right ascension of the ascending node (RAAN) for each of the orbits may be chosen to provide adequate range-rate (distance rate) differences between the satellites as seen from a surface-based location such as to enable use of FDOA and/or TDOA information to resolve the location of the source 206. The semi-major axis (SMA) of the orbits may be chosen to provide a drift-rate small enough so time spent inside the beam 306 aimed to the target orbit location 304 where the target satellite is locate may be sufficient to generate and process measurements from which the source may be geolocated. At the same time, the chosen drift rate may be large enough to allow the satellite constellation to survey multiple target orbit locations over different earth locations, and revisit those target locations of interest within the desired timeframe.

In some even more particular examples, the satellites 202 may have respective orbits having a number of orbit characteristics/orbital element values. Some of these orbit characteristics/orbital element values may be particular to instances in which the target orbit is a geosynchronous orbit (GSO), but in some examples, may be adapted to other target orbits. These orbit characteristics/orbital elements may include the direction of motion relative to the earth 100 (or other astronomical object) around which the satellites rotate, their SMA bias from the target (e.g., synchronous) orbit 302, inclination angle i, eccentricity, RAAN and argument of perigee, true anomaly and the like. These characteristics/ orbital element values may be the same or different across satellites of the constellation 204. In some examples in particular, the inclination angle i, eccentricity, RAAN and argument of perigee and/or true anomaly may be optimized to a different value for each satellite in the constellation.

The orbits of the satellites may be retrograde or prograde (direction of motion) relative to the earth 100 (or other astronomical object). A retrograde orbit may provide fast revisit rates (e.g., approximately twelve hours) of any number of desired target orbit locations 304. A prograde orbit may have a long revisit rate (e.g., approximately twenty-five days), but may require less launch vehicle performance.

The SMA bias from the target (e.g., synchronous) orbit 302 may be smaller to increase the number of target links 306 that may be visible to the satellite constellation 204 (increase the number of links within which the satellites may at some point be located within to capture interference). Smaller SMA bias may increase the difficulty in avoiding collisions with satellites in the geostationary belt, particularly for retrograde orbits. For prograde orbits, smaller SMA bias values may bring slower drift rates and longer revisit rates. If the SMA bias is zero, then the drift is zero, the revisit rate may be infinite and the satellite constellation may continuously monitor the same target orbit location 304.

Larger inclination angles i may provide more relative velocity between the satellites 202 of the constellation 204, and may allow for better geolocation of the source 206 of interference. But smaller inclination angles may increase the number of target links 306 that may be visible to the constellation. In some examples, the orbits in which the satellites are configured to revolve may have respective inclination angles that are within approximately two degrees of one another.

An eccentricity of zero may allow for uniform performance of the satellites 202 of the constellation 204 throughout their respective orbits. A non-zero value of eccentricity may be used to improve the relative velocities of the satellites and to improve target link visibility for portions of the target orbit.

The RAAN and argument of perigee may be chosen to phase the satellites 202 of the constellation 204 in such a way to provide adequate relative velocities between them. And the true anomaly may be chosen to provide adequate separation between the satellites. Larger separations may allow for better geolocation of the source 206 of interference, but larger separations may lessen the number of target links 306 that may be visible to the constellation.

Given the foregoing design considerations for the orbits of the satellites 202 of the constellation 204, one example process according to which the orbits may be chosen may include selection of a retrograde or prograde orbit and orbital element values for the satellite constellation. One example of the orbit type and orbital element values may be as follows:

Three satellites in retrograde orbits
SMA bias≈−1000 kilometers (with respect to geosynchronous SMA)
Eccentricity≈0
Inclination≈1 degree
RAANs separated by approximately 110 degrees
Argument of Perigee=0 (because of eccentricity≈0)
True Anomalies separated by approximately 252 degrees The target link visibility for the target links 306 of interest may then be evaluated, and the performance of the system given the relative satellite positions and velocities. If a set of target links of interest is not known, statistical analysis (e.g., Monte Carlo analysis) may be performed for the possible target links to be observed. This process may then be repeated for one or more different sets of orbital elements until a set of orbits that satisfies target link visibility and other requirements is obtained. In some examples, an optimization routine (with an appropriate objective function) may be used to facilitate this process.

Figure 6:
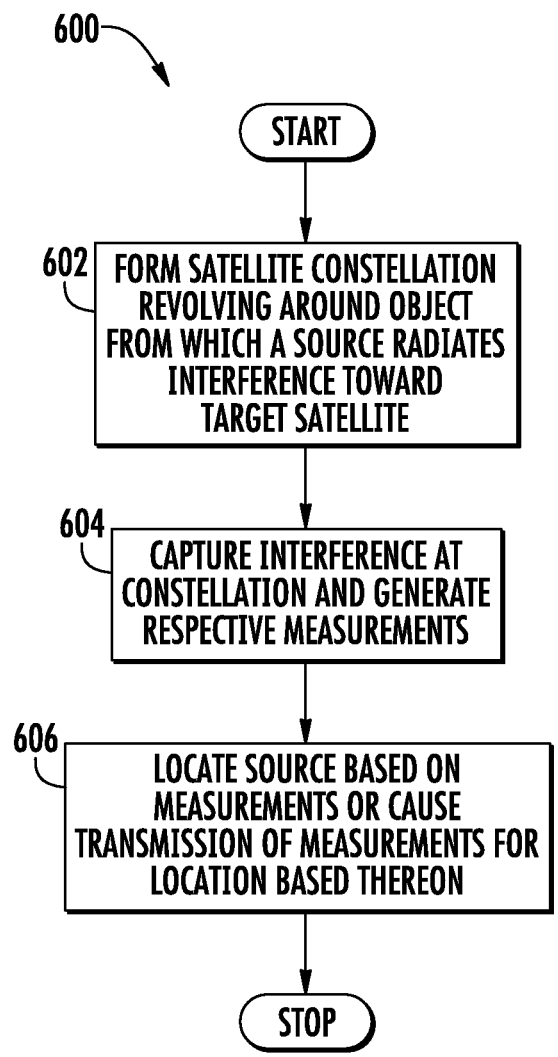
FIG. 6 illustrates a flowchart including various operations in a method according to aspects of example implementations.

FIG. 6 illustrates a flowchart including various operations in a method 600 according to example implementations of the present disclosure. As shown at block 602, the method may include forming a satellite constellation 204 including a plurality of satellites 202 around the earth 100 or some other rotating astronomical object having a surface 102 from which a source 206 radiates interference toward a target satellite 208 for at least some period of time as the target satellite revolves around the earth in a target orbit. The method of these example implementations also includes capturing the interference at the satellite constellation 204 when the constellation is substantially in-line between the source and target satellite, and generating respective measurements based thereon, as shown at block 604. And the method includes geolocating or causing transmission of the respective measurements for geolocation of the source based on the respective measurements to thereby identify a location of the source on the surface of the earth, as shown at block 606.

Figure 7:
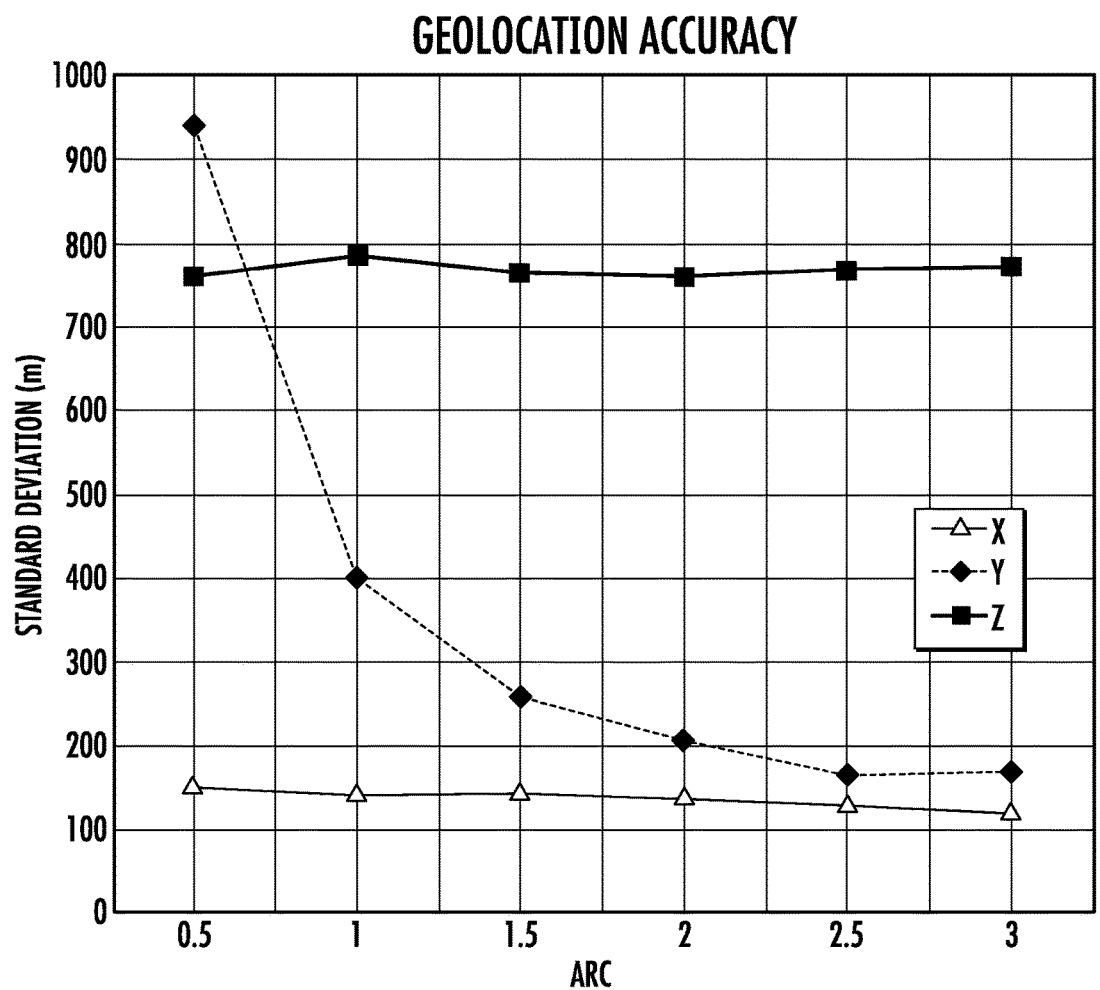
FIG. 7 illustrates a graph showing the accuracy as a function of satellite separation, according to example implementations.

Example implementations of the present disclosure may achieve location accuracies that are better than one kilometer. FIG. 7 illustrates a graph showing the accuracy as a function of satellite separation, according to example implementations. As shown, example implementations may achieve much higher accuracy than more conventional approaches.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
a plurality of satellites comprising respective antennas and circuitry,
wherein the plurality of satellites is configured to form a satellite constellation and revolve around a rotating astronomical object having a surface from which a source radiates interference in a beam having a beamwidth toward a specific location on a target orbit of a target satellite for at least some period of time as the target satellite revolves around the astronomical object in the target orbit, wherein the astronomical object is the earth, and the target satellite is a geosynchronous satellite that revolves around the earth in a geosynchronous orbit, and the satellite constellation being configured to revolve around the earth includes being configured to revolve in an over-synchronous orbit or under-synchronous orbit in the same direction as the rotation of the Earth such that the satellite constellation traverses an entire geosynchronous arc;
wherein the respective antennas are configured to capture the interference when the satellite constellation including the plurality of satellites is revolving in the over-synchronous orbit or under-synchronous orbit within the beamwidth of the beam between the source and the specific location, and the circuitry are configured to generate respective measurements based on the captured interference, and wherein the circuitry are configured to geolocate or cause transmission of the respective measurements for geolocation of the source based on the respective measurements to thereby identify a location of the source on the surface of the astronomical object.

2. The system of claim 1, wherein a plurality of target satellites that revolve around the astronomical object in the geosynchronous orbit, and
wherein the respective antennas are configured to capture the interference, and the circuitry are configured to geolocate or cause transmission of the respective measurements for geolocation of the source, for each of the plurality of target satellites.

3. The system of claim 1, wherein the plurality of satellites is configured to form the satellite constellation and revolve with a longitudinal separation between satellites of less than approximately two degrees, and in respective orbits having respective inclination angles that are within approximately two degrees of one another.

4. The system of claim 1, wherein the circuitry of a satellite of the plurality of satellites is configured to geolocate the source to thereby identify the location of the source, and cause transmission of the location of the source to a surface-based station on the astronomical object.

5. The system of claim 1, wherein the circuitry are configured to cause transmission of the respective measurements to a surface-based station on the astronomical object for geolocation of the source thereat.

6. A method comprising:
forming a satellite constellation including a plurality of satellites revolving around a rotating astronomical object having a surface from which a source radiates interference in a beam having a beamwidth toward a specific location on a target orbit of a target satellite for at least some period of time as the target satellite revolves around the astronomical object in the target orbit, wherein the astronomical object is the earth, and the target satellite is a geosynchronous satellite that revolves around the earth in a geosynchronous orbit, wherein forming the satellite constellation includes configuring the satellite constellation to revolve in an over-synchronous orbit or under-synchronous orbit in the same direction as the rotation of the Earth such that the satellite constellation traverses an entire geosynchronous arc;
capturing the interference at the plurality of satellites when the satellite constellation including the plurality of satellites is revolving in the over-synchronous orbit or under-synchronous orbit within the beamwidth of the beam between the source and the specific location, and generating respective measurements based on the captured interference; and
geolocating or causing transmission of the respective measurements for geolocation of the source based on the respective measurements to thereby identify a location of the source on the surface of the astronomical object.

7. The method of claim 6, wherein a plurality of target satellites that revolve around the astronomical object in the geosynchronous orbit, and wherein capturing the interference, and geolocating or causing transmission of the respective measurements for geolocation of the source, occur for each of the plurality of target satellites.

8. The method of claim 6, wherein the plurality of satellites form the satellite constellation and revolve with a longitudinal separation between satellites of less than approximately two degrees, and in respective orbits having respective inclination angles that are within approximately two degrees of one another.

9. The method of claim 6, wherein the source is geolocated at a satellite of the plurality of satellites to thereby identify the location of the source, and the method further comprises:
causing transmission of the location of the source from the satellite of the plurality of satellites to a surface-based station on the astronomical object.

10. The method of claim 6, wherein the respective measurements are transmitted from the plurality of satellites to a surface-based station on the astronomical object for geolocation of the source thereat.

11. The system of claim 1, wherein the plurality of satellites being configured to revolve in the over-synchronous orbit or under-synchronous orbit includes being configured to revolve in the over-synchronous orbit or under-synchronous orbit with a chosen semi-major axis that enables the satellite constellation to continuously monitor the specific location when the satellite constellation is within the beamwidth.

12. The method of claim 1, wherein configuring the satellite constellation to revolve in the over-synchronous orbit or under-synchronous orbit includes configuring the satellite constellation to revolve in the over-synchronous orbit or under-synchronous orbit with a chosen semi-major axis that enables the satellite constellation to continuously monitor the specific location when the satellite constellation is within the beamwidth.

* * * * *